UNITED STATES PATENT OFFICE.

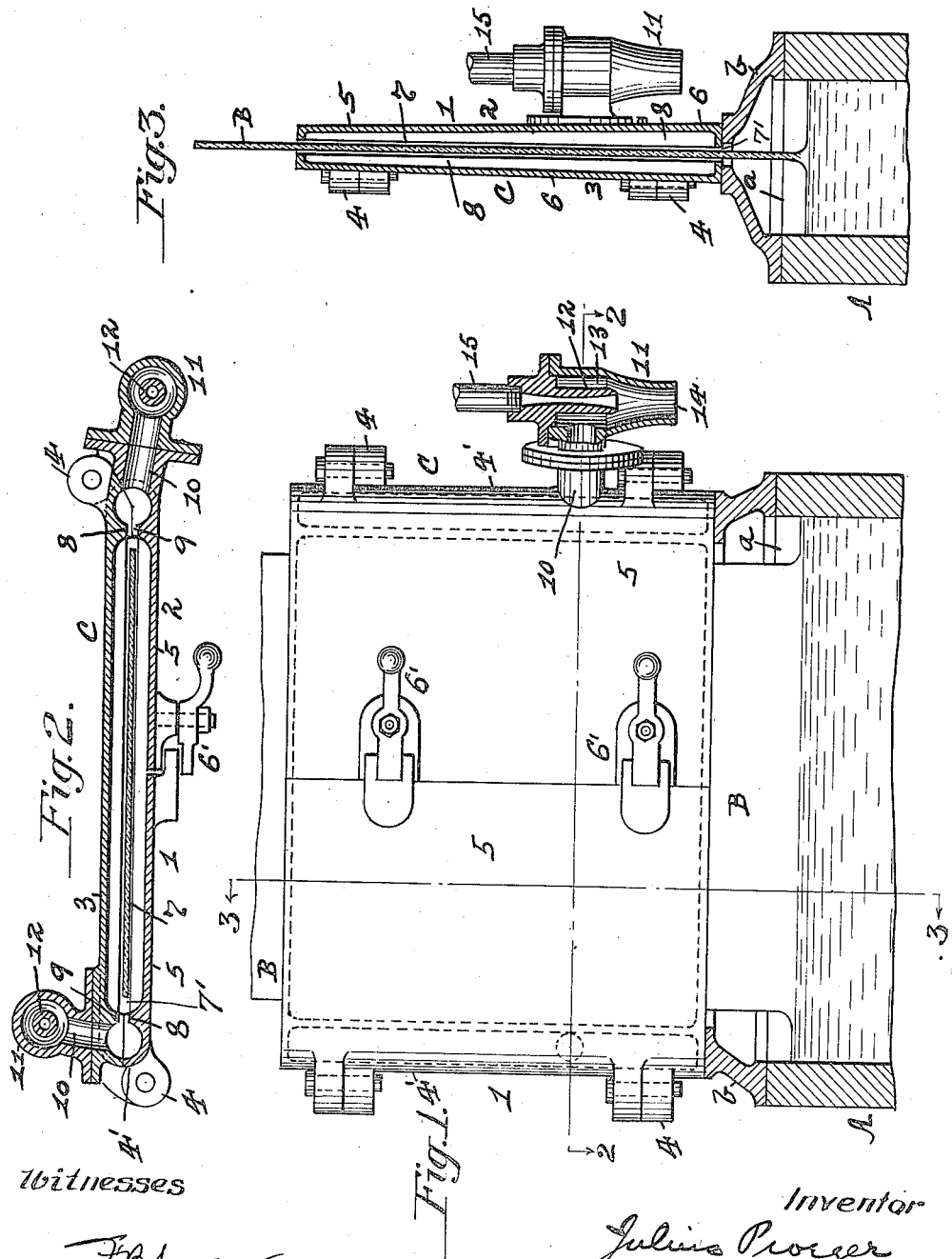

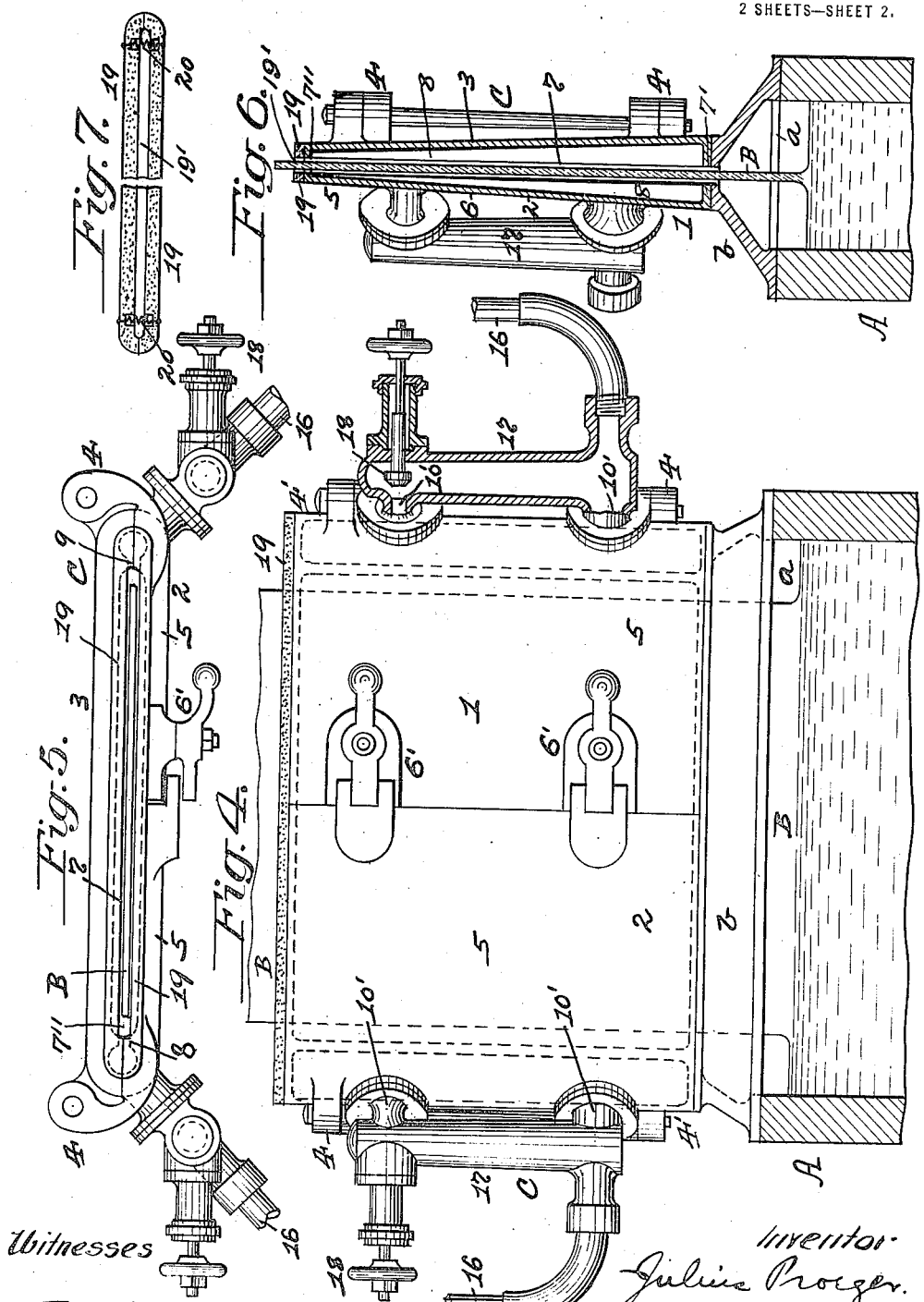

JULIUS PROEGER, OF PITTSBURGH, PENNSYLVANIA.

MANUFACTURE OF SHEET-GLASS.

1,320,091. Specification of Letters Patent. Patented Oct. 28, 1919.

Application filed August 9, 1918. Serial No. 249,110.

*To all whom it may concern:*

Be it known that I, JULIUS PROEGER, a citizen of the United States, and resident of Pittsburgh, in the county of Allegheny and State of Pennsylvania, have invented a new and useful Improvement in Manufacture of Sheet-Glass; and I do hereby declare the following to be a full, clear, and exact description thereof.

My invention relates to the manufacture of sheet glass, and has special reference to such manufacture of sheet glass wherein a flat sheet of glass is drawn vertically out of a furnace.

It is well known in the manufacture of sheet glass that during the process of drawing the flat sheet by the ordinary approved methods or processes, the outer edges on both sides of the sheet are more exposed to atmospheric pressure than the center of the sheet, and therefore such sides will cool more rapidly than the center of the sheet, while the heat in the sheet will thus remain longer in the center of the sheet, and thus cause the center of the sheet to have a higher heat by many degrees than the sides or edges of the same, thereby forming irregularity of shrinkage and warping of the sheet and rendering the same useless in many cases.

The object of my invention is to provide a cheap, simple and efficient process and apparatus, which will overcome the difficulties and objections above named, and will provide for an equal and proper distribution of the heat in the sheet of glass while being drawn.

To these ends my invention consists, generally stated, in the novel process and apparatus as hereinafter more specifically set forth and described, and particularly pointed out in the claims.

To enable others skilled in the art to which my invention appertains to practice the process and construct and use the apparatus, I will describe the same more fully, referring to the accompanying drawings, in which—

Figure 1 is a side elevation of an apparatus for carrying out my invention, and showing a portion of a glass furnace, to which such apparatus is applied;

Fig. 2 is a cross-section of the same on the line 2—2 Fig. 1 looking in the direction of the arrows.

Fig. 3 is a vertical central section of the apparatus on the line 3—3 looking in the direction of the arrows.

Fig. 4 is a side view of another form of the apparatus;

Fig. 5 is a top view of the same; and

Fig. 6 is a vertical central section of the same.

Fig. 7 is a plan view of the box cover.

Like symbols of reference herein indicate like parts in each of the figures of the drawings.

As illustrated in the drawings $a$ represents the drawing mouth or opening of any ordinary approved glass furnace A, and from which furnace and through which mouth the usual glass sheet B is drawn from the molten glass in such furnace by any suitable form of bait or other means (not shown) attached to the upper end of such sheet.

Extending around the sheet of glass B, as it is drawn from the furnace mouth $a$ is my improved heat distributing apparatus C, which is adapted to be supported over such mouth by means of a base $b$ under the same and resting upon the furnace A at any suitable place for operating. This apparatus C comprises a vertical heat distributing receptacle or box 1 extending up from the base $b$, which is provided with a front wall 2 and a rear wall 3, which are perfectly tapered inwardly from the bottoms of the same to the tops of the same, as shown in 6, in order to provide for the heat from the furnace by forming the cavity 7 wider at the lower end adjacent the furnace A. The walls 2 and 3 are hinged together at each end 4' of the same, such as by the hinges 4, and the front wall 2 is made in the form of two doors 5, which meet at their vertical centers, and are secured together by means of suitable latches or locks 6'. When the doors 5 forming the wall 2 are closed, such wall with the wall 3 forms a narrow opening or sheet cavity or passageway 7 through the box 1 for the passing of the glass sheet B from the furnace A, as hereinafter described, and with an opening 7' in the bottom and an opening 7'' in the top of the receptacle 1, the opening 7' being for the entrance of the sheet into the receptacle and the opening 7'' for the exit of the same therefrom, Within the opening 7 in the box 1 and on each side of the same are the ribs 8, which are adapted to form a slot 9 between the same and on a line with the width of the sheet of glass B being drawn from the furnace A.

At each side of the box 1 and extending through the ends 4' of the doors 5 forming the front wall 2 and through the rear wall 3 is a passageway 10, which opens into the opening or cavity 7 and connects with a suitable air ejector 11 at each end of and exteriorly of the said box. Each of these ejectors 11 is provided with a nozzle 12 within the same, the mouth of which extends below the passage way 10 and around which nozzle is a chamber 13. An exit opening 14 for the escape of the air is formed in the bottom of the ejectors 11 and connecting with the nozzle 12 and at the top of each ejector is an air supply pipe or hose 15 which leads from a suitable air tank or other source of supply.

In the practising of my improved process and using my improved apparatus, in connection with the drawing of sheet glass, the doors 5 forming the wall 2 are opened, and when the glass sheet B is being drawn from the furnace A up along the wall 3 in the box 1, the said doors are closed, thereby confining the sheet in the opening or cavity 7 formed by said walls and allowing the gases from the furnace to enter said cavity through the opening 7'. After this is accomplished, and while the sheet B is being drawn the air is admitted through the pipes 15 into the nozzles 12, and by such air passing through such nozzles and out through the exit opening 14 into the open air, such air will act to draw the heated air along the glass sheet B from the center to the outer ends or sides of the same, through the slots 9 in the openings or cavity 7 into the chamber 13 of the ejectors 11 and into the open air through the exit openings 14, thereby drawing the hot gases from the center or intermediate portion of the glass sheet to the side of the same and thus distributing the heat equally throughout the sheet, so that in the further drawing of the sheet it gradually cools off and thus retains its shape. After the glass sheet B, in a suitable length, has been thus treated, the doors 5 are opened and the sheet removed, when the parts are then ready for the treatment of another sheet, as above described.

If desired, an ordinary air pump (not shown) can be used with my approved apparatus in practising my improved process, in which case, as shown in Figs. 4, 5 and 6, such pump can be connected through a flexible pipe or hose 16 with the supply connections 17 extending along the side edges or ends of the doors 5 and from which passage ways 10' are formed at the top and bottom of the box 1 for opening into said connections from the opening or cavity in said box.

In case it is desired, valves 18 can be attached to such connections 17 for engaging with the upper passageways 10' to allow cold air to enter the top of the box from the open air for chilling off the sheet to retain its shape in the rapid working of the process and apparatus.

If desired, such as shown in Figs. 4 and 6, a suitable non-combustible covering, such as the asbestos boards 19, can be placed over the top of the box 1 and on each side of the glass sheet B, in order to close off cold air from entering the upper end of said box and assist in confining the air in drawing the same along the sheet from the center to the sides of the same.

These coverings 19 can be connected together by any suitable connection, such as by the springs 20 between the same and thereby enable such coverings to move with the sheet in case of any swinging in the drawing of such sheet and an opening 19' is formed between the coverings to allow the passage of the sheet through the same.

It will be evident that various other modifications, changes and additions to the apparatus employed, may be resorted to, without departing from the spirit of the invention or sacrificing any of its advantages.

It will thus be seen that my improved process and apparatus can be easily and conveniently practised and used in connection with the drawing of sheet glass, without regard to the means for drawing such sheet, and as has been found, will insure an equal distribution of heat in the sheet in the operation of drawing the same and thereby prevent warping of the finished sheet.

What I claim as my invention and desire to secure by Letters Patent is:

1. An apparatus for equalizing heat in glass sheets during the drawing of the same, comprising a substantially inclosed receptacle for said sheet, said receptacle having a passage-way through the same and provided with an opening in the top and bottom of the same, the opening in the bottom allowing the entrance of gases into the receptacle, and means connected to said receptacle for drawing the hot gases from the sides of the same, thereby allowing the gases to move across the sheet.

2. An apparatus for equalizing heat in glass sheets during the drawing of the same, comprising a substantially inclosed receptacle for said sheet adapted to be supported in front of the drawing mouth of the furnace, said receptacle having a passage-way through the same and provided with an opening in the top and bottom of the same, the opening in the bottom allowing the entrance of gases into the receptacle from the furnace, and means connected to said receptacle for drawing the hot gases from the sides of the same, thereby allowing the gases to move across the sheet.

3. An apparatus for equalizing heat in glass sheets during the drawing of the same, comprising a substantially inclosed receptacle for said sheet, said receptacle being formed of a stationary wall and a movable wall connected together and adapted to form a passage-way between the same, said passageway being provided with an opening in the top and bottom of the same, the opening in the bottom allowing the entrance of gases into the receptacle, and means connected to said receptacle for drawing the hot gases from the sides of the same thereby allowing the gases to move across the sheet.

4. An apparatus for equalizing heat in glass sheets during the drawing of the same, comprising a substantially inclosed receptacle for said sheet, said receptacle having a passageway through the same and provided with an opening in the top and bottom of the same, the opening in the bottom allowing the entrance of gases into the receptacle, a narrow opening in said receptacle connecting with said passage-way, and means connected to said receptacle and communicating with said opening for drawing the hot gases from the sides of said receptacle, thereby allowing the gases to move across the sheet.

5. An apparatus for equalizing heat in glass sheets during the drawing of the same, comprising a substantially inclosed receptacle for said sheet, said receptacle having a passage-way through the same and provided with an opening in the top and bottom of the same, the opening in the bottom allowing the entrance of gases into the receptacle, ribs in said receptacle adapted to form a narrow opening connecting with said passage-way, and means connected to said receptacle and communicating with said opening for drawing the hot gases from the sides of said receptacle, thereby allowing the gases to move across the sheet.

6. An apparatus for equalizing heat in glass sheets during the drawing of the same, comprising a substantially inclosed receptacle for said sheet, said receptacle having a passage-way through the same and provided with an opening at each end of the same, the opening at one end allowing the entrance of gases into the receptacle, and means connected to said receptacle and opening along the entire sides of the same for drawing the hot gases from the sides of the same, thereby allowing the gases to move across the sheet.

7. An apparatus for equalizing heat in glass sheets during the drawing of the same, comprising a substantially inclosed receptacle for said sheet, said receptacle having a passage-way through the same and provided with an opening at each end, the opening at one end allowing the entrance of gases into the receptacle, and ejector means connected to said receptacle and opening along the entire sides of the same for drawing the hot gases from the sides of the same, thereby allowing the gases to move across the sheet.

In testimony whereof, I the said JULIUS PROEGER, have hereunto set my hand.

JULIUS PROEGER.

Witnesses:
J. N. COOKE,
J. M. GEOGHEGAN.